United States Patent
Culver

[11] 3,739,172
[45] June 12, 1973

[54] CIRCUIT FOR IMPROVING DATA IN PULSE DETECTION SYSTEMS

[75] Inventor: Richard B. Culver, Houston, Tex.
[73] Assignee: Dresser Industries, Inc., Dallas, Tex.
[22] Filed: May 24, 1971
[21] Appl. No.: 146,261

[52] U.S. Cl. ..................... 250/83.3 R, 250/83.6 W
[51] Int. Cl. ............................................. G01t 1/16
[58] Field of Search ............... 250/83.3 R, 83.6 W; 307/232, 234, 260; 328/59, 109

[56] References Cited
UNITED STATES PATENTS

| | | | |
|---|---|---|---|
| 3,435,224 | 3/1969 | Zemanek | 250/83.6 W |
| 3,309,521 | 3/1967 | Bargainer | 250/83.6 W |
| 3,405,349 | 10/1968 | Moran | 250/83.6 W |
| 3,259,880 | 7/1966 | Zemanek | 250/83.3 R |

Primary Examiner—James W. Lawrence
Assistant Examiner—D. C. Nelms
Attorney—Robert W. Mayer, Thomas P. Hubbard, Jr., Daniel Rubin, Raymond T. Majesko, Roy L. Van Winkle, William E. Johnson, Jr., Eddie E. Scott and Morgan L. Crow

[57] ABSTRACT

The amplified pulses from a radioactivity detector are coupled through a delay line to a linear gate. The amplified pulses from the detector are also connected to a discriminator. The output of the discriminator is AND gated in a logical gate with a clock pulse which is synchronized with a high energy neutron source. The AND gate triggers a single shot multivibrator which in turn triggers the linear gate. The delay line allows for the time required for the detector pulse to rise to the discriminator threshold and for the propagation delay in the logic circuitry. The linear gate opens before the arrival of the detector pulse and closes after it passes through. In this embodiment, any detector pulse having the necessary discriminator level occuring within the clock pulse interval passes through the linear gate as a full width pulse. In an alternative embodiment, a J-K flip-flop circuit is triggered by the trailing edge of the single shot multivibrator to disable the AND gate, thus causing the linear gate to pass only the first detected pulse having the necessary discriminator level.

14 Claims, 3 Drawing Figures

PATENTED JUN 12 1973    3,739,172

INVENTOR
RICHARD B. CULVER

William E. Johnson Jr
ATTORNEY

CIRCUIT FOR IMPROVING DATA IN PULSE DETECTION SYSTEMS

RELATED APPLICATION

This application relates to my co-pending application, Ser. No. 146,332, filed 5-24-71, entitled METHOD AND APPARATUS FOR LOGGING WELL BOREHOLES WITH GAMMA RAYS FROM THE INELASTIC SCATTERING OF FAST NEUTRONS.

BACKGROUND OF THE INVENTION

This invention relates generally to the art of geophysical prospecting and more particularly to the art of radioactivity well logging involving the counting and spectral distribution of pulses resulting from the detection of such radioactivity.

As is well known in the art of radioactivity well logging, the detection of gamma rays from the inelastic scattering of fast neutrons is generally accomplished by pulsing a scintillation detector coincidentally with a fast neutron source. The difficulties involved in this measurement are numerous, not the least being the slow rate of accumulating data.

Sodium iodide detectors are normally used in subsurface spectral measurement systems because they offer the best compromise of physical and electrical characteristics. Good linearity and resolution can be obtained with detector output pulse widths of about 1.2 microseconds. However, when the pulses are transmitted over a well logging cable, any pulse arriving at the surface for analysis will have been spread in time to about 10 microseconds by its transit over the four miles of cable that typically separates the surface and subsurface systems.

The fast multichannel analyzers that are presently available have pulse pair resolving times of about 15 microseconds for pulses of this width. The maximum pulse rate will be less than the detector pulsing frequency if good resolution is maintained. This is due to the statistical nature of the data; as the average data rate approaches the pulsing frequency, the probability of a second detector pulse occurring during the detector gating interval becomes large, and the pulse spectrum is distorted due to pulse pile-up on the line.

It is therefore the primary object of the present invention to provide a circuit which substantially reduces the problem of pulse pile-up on the line; and It is another object of the invention to provide a new and improved circuit for preventing pulse pile-up on the line which passes only the first detected pulse following a given segment of a neutron source pulse.

SUMMARY OF THE INVENTION

The objects of the invention are accomplished, broadly, by a circuit which utilizes a combination of energy discrimination and delay logic for reducing the probability of pulse pile-up. In an alternative embodiment, means are provided for allowing the first, and only the first, detector pulse after the beginning of a segment of the clock interval to be transmitted. Again, in the alternative embodiment, the pulse is full width even should it occur late in the clock interval.

The discriminator may be set just above the noise if all pulses are to be analyzed, or unneeded pulses may be eliminated by appropriate adjustment of the discriminator threshold.

These and other objects, features and advantages of the invention will become apparent to those skilled in the art from the following detailed description, when considered with the accompanying drawing, in which.

Figure 1:
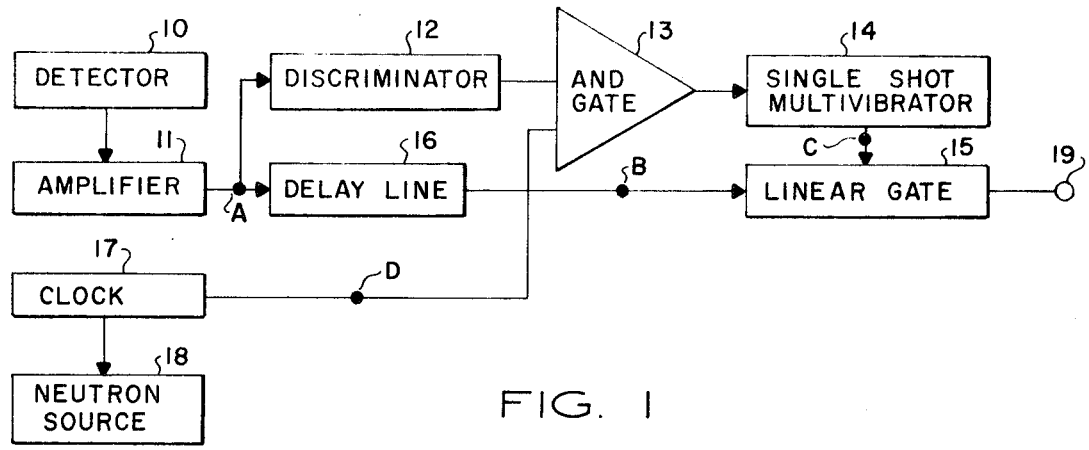
FIG. 1 is a block circuit diagram of one embodiment of the invention.

Referring to the drawings in more detail, particularly to FIG. 1, there is illustrated in block diagram a circuit which can be used to aid in reducing the probability of pulse pile-up within instrumentation which is used in conducting a radio-activity well survey. It should be appreciated that the circuits embodied herein find utility in my above-referenced co-pending application and the disclosure of such application is incorporated herein by reference.

The detector 10, which may be used in a well logging instrument not illustrated, is a scintillation counter arranged for gamma ray spectral analysis in accordance with prior art. In the preferred embodiment, it is a NaI (Tl) crystal having a 2 inch diameter with a 3 inch length, such crystal being coupled to a Model Number 4518 photomultiplier tube available from the Radio Corporation of America. Such a crystal-photomultiplier combination may have a resolution of 7.5 to 8.5 percent with a 660 kev cesium 137 peak. The output of the detector 10 is coupled into an amplifier 11. The output of amplifier 11 is coupled through a discriminator 12 which in turn is coupled into one of the two inputs to the AND gate 13. The discriminator 12 is used to remove pulse having amplitude below a selectable threshold value which might otherwise cause pile-up on the transmission line normally connected to the output terminal 19. A setting of 400 kev is generally suitable for this purpose. The output of the discriminator 12 is AND gated in the AND gate 13 with a voltage pulse having a nominal width of ten microseconds from the clock and sequence circuit 17. The output of the AND gate 13 triggers a single shot multivibrator circuit 14 which is nominally set to have a 1.6 microsecond wide pulse output for controlling the linear gate 15. The clock 17 is also synchronized with the neutron source 18. The pulse from the clock actuates a high voltage pulser (not illustrated) arranged to cuase the neutron output of neutron source 18 to pulse at the clock frequency as described in U.S. Pat. No. 3,309,522.

The amplified pulses from the amplifier 11 are also coupled into the delay line 16, which is nominally set to cause a delay of 0.4 microseconds, the output of which is coupled into the linear gate 15.

Figure 3:
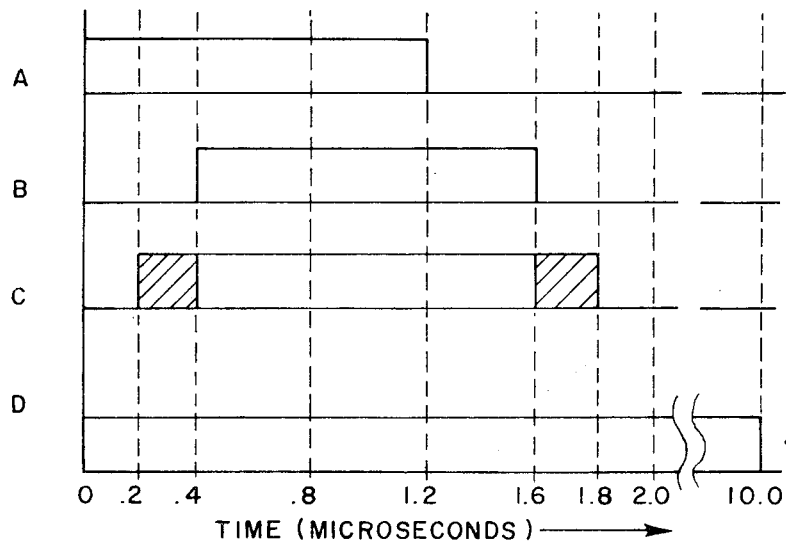
FIG. 3 graphically illustrates various wave forms throughout the circuits of FIG.'s 1 and 2.

The operation of the circuit of FIG. 1 can best be explained by reference to FIG. 3, wherein various wave forms appearing in the circuitry of FIG. 1 are graphically illustrated. In FIG. 3, the pulse appearing at point A, having a duration of 1.2 microseconds, is representative of the output of the amplifier 11. The pulse appearing at point B is representative of the output of the delay line 16. The point C is representative of the output of the single shot multivibrator 14. The point D is representative of the pulse transmitted from the clock 17 to enable the AND gate 13 in conjunction with a pulse from the discriminator 12. It should be appreciated from observing the pulse wave forms of FIG. 3 that the linear gate 15 is open approximately 200 nanoseconds before the arrival of the detector pulse and closes about 200 nanoseconds after the detector pulse passes through the linear gate. The 200 nanosecond factor is shown by the cross hatched areas on the wave form of point C in FIG. 3. It should also be appreciated that any detector pulse exceeding the threshold of the discriminator 12 and commencing within the time interval of the master gate pulse from the clock 17 is passed by the linear gate 15 to the output point 19. The point 19 would correspond to a point which would normally be associated with the amplification and transmittal of pulses to the earth's surface in well logging utility.

It should also be appreciated that by AND gating the 10 microsecond clock pulse with the discriminator output to provide the trigger for the single shot multivibrator which in turn controls the opening of the linear gate, rather than triggering the single shot multivibrator from the discriminator and gating the single shot multivibrator output and the clock pulse for the linear gate control signal, a detector pulse occurring near the end of the clock pulse interval is passed as a full width pulse instead of being chopped off as would otherwise occur.

Figure 2:
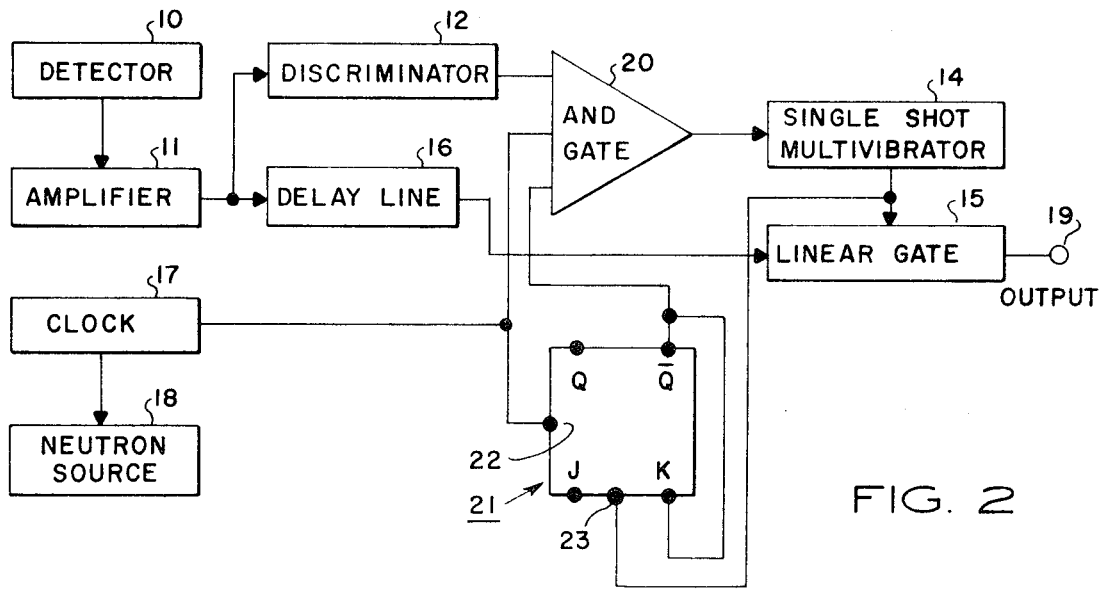
FIG. 2 is a block circuit diagram of an alternative embodiment of the invention.

Referring now to FIG. 2, a three input AND gate 20 is used as a substitute for the two input AND gate 13 of FIG. 1. Two of the inputs to the AND gate 20 of FIG. 2 are connected to the output of the clock 17 and the discriminator 12, respectively. The third input of the AND gate 20 is connected to the $\overline{Q}$ output of the J-K flip-flop circuit 21. Such J-K flip-flop circuits are conventional and are discussed at length in U.S. Pat. No. 3,268,741. The steering terminal K is also connected to the $\overline{Q}$ output terminal. The output of the clock 17 is also coupled into the "clear" input terminal 22 of the circuit 21. The clock pulse input terminal 23 of the J-K flip-flop circuit 21 (not to be confused with the clock 17) is connected to the output of the single shot multivibrator 14.

The operation of the circuit of FIG. 2 is very much like that of the operation of the circuit of FIG. 1, except for the interaction of the J-K flip-flop circuit 21. The flip-flop circuit 21 is enabled, with its output positive, when the clock pulse from the clock 17 rises from ground to its positive level. Thereafter, the first detector pulse within the ten microsecond clock interval exceeding the discriminator trigger level produces an output from the single shot multivibrator and is passed by the linear gate 15. The J-K flip-flop circuit 21 changes state on the trailing edge of the single shot pulse from the single shot multibibrator 14 and disables the AND gate 20. Thus, the first, and only the first, detector pulse occurring during the interval of the clock pulse is passed by the linear gate 15. Again, the pulse output from the linear gate 15 is full width even should it occur late within the clock interval.

The discriminator may be set just above the noise if all pulses are to be analyzed, or unneeded pulses may be eliminated by appropriate adjustment of the discrminator threshold.

As with the circuit of FIG. 1, the neutron source 18 of FIG. 2 is synchronized to run with the pulse from the clock 17. However, if the leading edge of the clock pulse is made to occur shortly before the neutron source begins emitting neutrons, for example about 1 microsecond, the source output can be adjusted so that the average number of pulses received at the surface approaches the pulsing frequency with a nearly zero probability of pulse pile-up on the line and a low probability of pile-up within the detector crystal.

Thus, it should be appreciated that there has been described herein the preferred embodiments of the invention for either eliminating or materially reducing the effect of pulse pile-up within a detection and transmission system. However, it should also be appreciated that various modifications to these embodiments will occur to those skilled in the art and that such modifications are contemplated by the disclosure herein. For example, by triggering the single shot multivibrator directly from the discriminator and gating the single shot multivibrator output and the clock output for the linear gate control signal, a detector pulse occurring late within the clock pulse can nonetheless be passed through the linear gate if there is no concern about chopping of the pulse. Likewise, if desired, means other than the J-K flip-flop can be used to disable the AND gate 20, such as, for example, various combinations of other logic gates.

The embodiments of the invention in which an exclusive property or privilege is claimed are defined as follows:

1. In a radioactivity well logging system having a pulsed neutron source and a radioactivity detector system having electrical pulses at its output wherein electrical pulses tend to pile up within the system, the improvement comprising means to selectively gate only a single electrical pulse from the output of said radioactivity detector system indicative of detected radiation following the commencement of each neutron source pulse.

2. In the system according to claim 1, said selective gating means being further characterized as being synchronized with the pulsing of said neutron source.

3. In the system according to claim 2, said selective gating means being further characterized as including means to discriminately gate only those pulses having a predetermined characteristic.

4. In the system according to claim 3, wherein said predetermined characteristic is functionally related to the energy level of gamma rays of interest emanating from the formations surrounding the well bore.

5. In the system according to claim 2, said selective gating means being further characterized as including means to gate only the first such electrical pulse following a preselected event associated with the pulsing of said neutron source.

6. In an electrical circuit in which electrical pulses are cyclically associated with a synchronized event, the improvement comprising:
   clock means for producing a series of synchronizing gate pulses;
   an input terminal for receiving electrical pulses associated with said synchronizing gate pulses;
   delay means connected to said input terminal;
   a first electrical gate connected to the output of said delay means;
   a second electrical AND gate having two gate inputs, the first of said gate inputs being connected to said clock means and the second of said gate inputs being connected to said input terminal;
   a single shot multivibrator connected to the output of said AND gate, the output of said multivibrator being connected to said first electrical gate for triggering said first gate; and an output terminal connected to the output of said first gate.

7. In the circuit according to claim 6, being further characterized as including discriminator means between said input terminal and the second of said AND gate inputs.

8. In the circuit according to claim 7, wherein said first electrical gate is a linear gate.

9. In an electrical circuit in which electrical pulses are cyclically associated with a synchronized event, the improvement comprising:

clock means for producing a series of synchronizing gate pulses;

an input terminal for receiving electrical pulses associated with said synchronizing gate pulses;

delay means connected to said input terminal;

a first electrical gate connected to the output of said delay means;

a J-K flip-flop circuit having a first input steering terminal, a clearing input terminal and a clock input terminal and providing an output signal at an output terminal of said flip-flop circuit, said clearing input terminal being connected to said clock means;

a second electrical AND gate having three inputs, the first of said gate inputs being connected to said clock means and the second of said gate inputs being connected to said input terminal;

a single shot multivibrator connected to the output of said AND gate, the output of said multivibrator being connected to said first electrical gate for triggering said first gate and also being connected to the clock input terminal of said J-K flip-flop circuit, said input steering terminal being connected to said output terminal of said J-K flip-flop circuit and to the third gate input of said AND gate; and an output terminal connected to the output of said first gate.

10. In the circuit according to claim 9, being further characterized as including discriminator means between said input terminal and the second of said AND gate inputs.

11. In the circuit according to claim 10, wherein said first electrical gate is a linear gate.

12. In an electrical circuit in which electrical pulses are cyclically associated with a synchronized event, the improvement comprising:

clock means for producing a series of synchronizing gate pulses;

an input terminal for receiving electrical pulses associated with said synchronizing gate pulses;

delay means connected to said input terminal;

a first electrical gate connected to the output of said delay means;

a second electrical AND gate having three gate inputs, the first of said gate inputs being connected to said clock means and the second of said gate inputs being connected to said input terminal;

a single shot multivibrator connected to the output of said AND gate, the output of said multivibrator being connected to said first electrical gate for triggering said first gate;

bistable circuit means responsive to said clock means and to the output of said single shot multivibrator, the output of said circuit means being connected to the third input of said AND gate, whereby said bistable means are in one stable condition in response to said clock means and in another stable position in response to said single shot multivibrator; and an output terminal connected to the output of said first gate.

13. In the circuit according to claim 12, being further characterized as including discriminator means between said input terminal and the second of said AND gate inputs.

14. In the circuit according to claim 13, wherein said first electrical gate is a linear gate.

* * * * *